United States Patent [19]

Coburn, Jr.

[11] Patent Number: 4,761,320

[45] Date of Patent: Aug. 2, 1988

[54] RELEASE MATERIAL

[76] Inventor: Joseph W. Coburn, Jr., 1650 Corporate Road West, Lakewood, N.J. 08701

[21] Appl. No.: 24,411

[22] Filed: Mar. 11, 1987

Related U.S. Application Data

[63] Continuation of Ser. No. 808,460, Dec. 13, 1985, abandoned.

[51] Int. Cl.⁴ .............................................. B32B 3/30
[52] U.S. Cl. .................................. 428/167; 428/172; 428/352; 428/451; 428/452; 428/481; 428/513; 428/537.5
[58] Field of Search ................ 428/40, 172, 352, 481, 428/513, 447, 451, 452, 537.5; 427/209

[56] References Cited

U.S. PATENT DOCUMENTS 3,518,158  6/1970  Hurst ........................... 428/537.5
4,539,056  9/1985  Takeshita et al. ............. 428/151

Primary Examiner—John E. Kittle
Assistant Examiner—P. R. Schwartz
Attorney, Agent, or Firm—R. Gale Rhodes, Jr.

[57] ABSTRACT

Improved release material including a paper substrate, and a layer of plastic film on one surface of the paper substrate, said layer of plastic film provided with an outer surface for substantially eliminating area contact between said layer of plastic film and material in engagement therewith; in a preferred embodiment the outer surface is an embossed surface which provides substantially line contact between said layer of plastic film and the material in engagement therewith.

5 Claims, 1 Drawing Sheet

FIG. 1
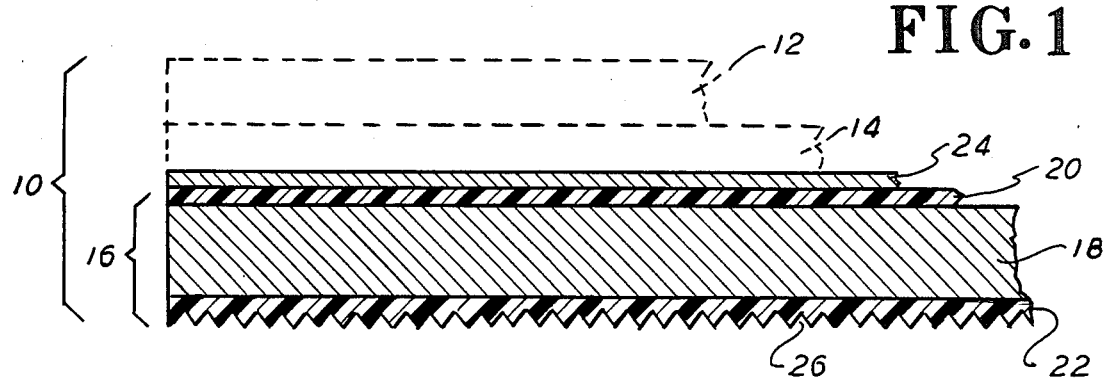
FIG. 2
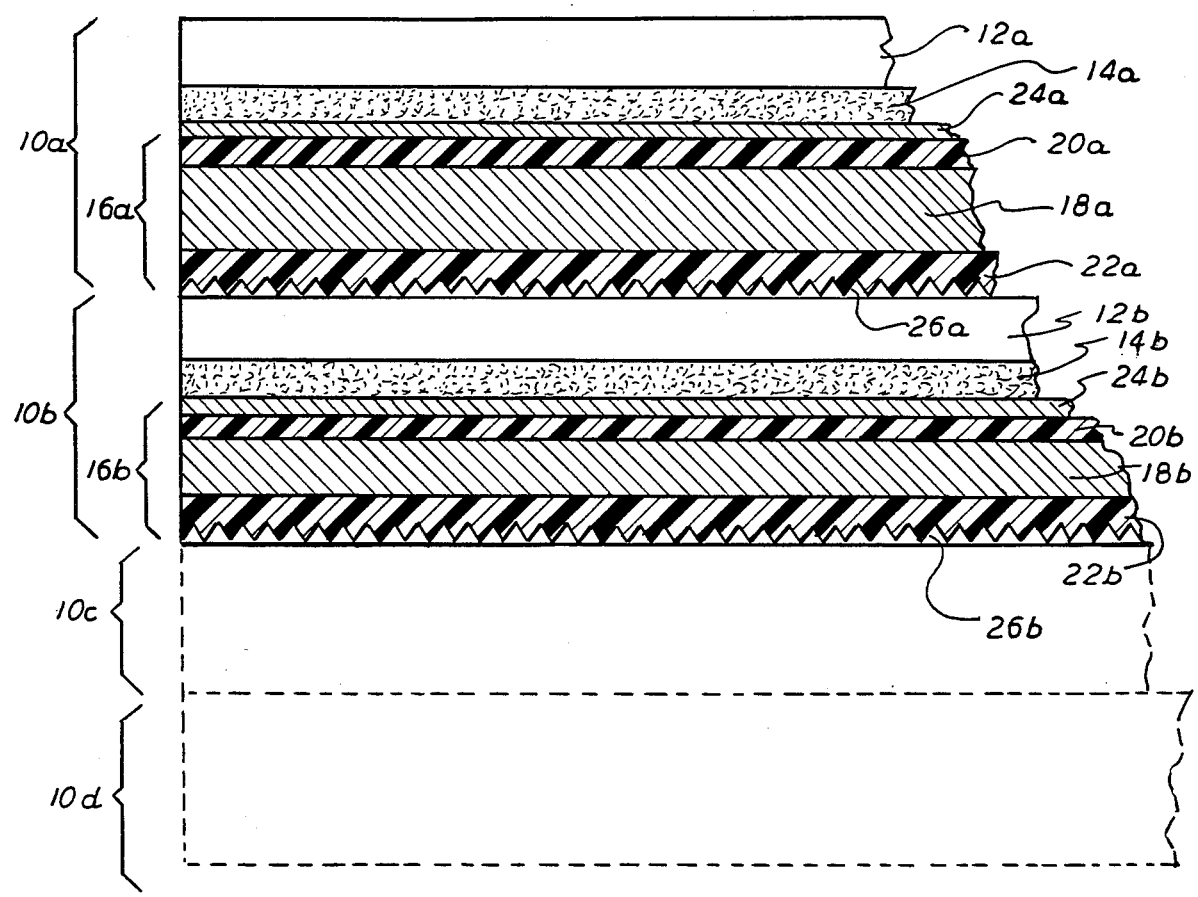
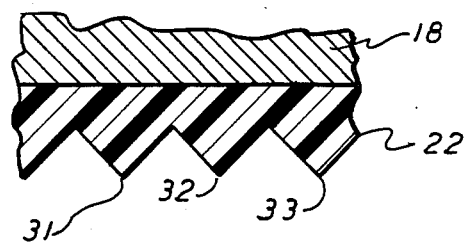
FIG. 3

RELEASE MATERIAL

This is a continuation of application Ser. No. 06/808,460, filed Dec. 13, 1985, now abandoned.

BACKGROUND OF THE INVENTION

1. Field of the Invention

This invention relates generally to improved release material, such as release sheets or webs.

2. Description of the Prior Art

Release material, such as release webs and sheets, are well-known to the prior art and have previously been used in a wide variety of articles of manufacture typically for temporarily covering a tacky adhesive such as a pressure sensitive adhesive, and/or have been used in a wide variety of manufacturing processes for transferring or conveying tacky adhesives such as a coating of pressure sensitive adhesive.

However, such prior art release sheets or webs usually have a number of disadvantages, for example many such sheets are susceptible to a high degree of curl on storage or in use, particularly where they are composed of paper coated on only one surface with polyethylene or the like, and where such prior art release webs or sheets include a paper coated on both surfaces by polyethylene or the like to prevent such curl, the structure has no readily printable surface for printing instructions, e.g. logos, and the like.

A solution to the lack of printability of prior art release sheets or webs including a layer of paper provided on both surfaces with a layer of polyethylene or the like is disclosed in U.S. Pat. No. 3,518,158, patented June 30, 1970 to Alan R. Hurst. The release sheet or web disclosed by Hurst includes an exposed layer of absorbent printed material, such as tissue paper, provided on the outer surface of one of the layers of polyethylene or the like. While this layer of absorbent printable material overcomes the above-noted printability problem, it has been found that such absorbent material, particularly when embodied as a layer of tissue paper, can absorb at least some moisture and cause the release material to curl to at least some unwanted degree both during storage and in use.

As is further known to those skilled in the release material art, ofttimes release sheets or webs are provided with silicone coatings to improve the release properties. However, when a release web is provided with a silicone coating and stored in roll form, a common practice, the reverse side of the web can pick up silicone coating by offsetting which later can be objectionably transferred during use of the web; such objectionable silicone offsetting is also known to sheet release material wherein the sheet release material, before being applied to other structures, is stacked vertically before the silicone is completely cured causing transfer or offsetting of silicone from the top surface of a lower sheet to the bottom surface of the next above sheet.

Still further as is known to those skilled in the release material art, the material or other structure to which the release material (sheet or web) is applied can frequently have its outer surface imprinted with indicia by the application of wet ink and when the printed structure with the release material applied thereto is stored either in roll form or in stacked sheets, a layer of polyethylene on the release material will be in engagement with the undried ink and can unwantedly smear the undried ink or cause the undried ink to unwantedly offset onto the layer of polyethylene; inks used in these processes, as is known, dry or cure slowly by the process of oxidation which exacerbates the noted ink smearing or offsetting problems.

Yet another problem known to prior art release material, particularly when embodied in sheet form and applied or adhered to other structure, or when embodied in roll form and adhesed to a roll of other structure whereafter the combined structures are cut into sheets and stacked, is that of afterwards producing separation between adjacent layers or stacks of composite structure, as is required in sheet feeding, particularly wherein the outer or top surface of the structure to which the release material or sheet is adhered is itself a plastic film or the like. In such a case, due to the noted stacking, the bottom surface of the release material polyethylene on the above combined structure is pressed or forced into tight area contact or engagement with the top plastic surface of the below combined structure, thereby inhibiting relative sliding motion between the engaged composite structures as is required for sheet feeding. Such area contact, as is further known to those skilled in the art, further not only unwantedly inhibits sheet feeding and causes generation of undesirable static charge upon separation but also exacerbates the above-noted prior art problems of silicone and undried ink offsetting and smearing.

Accordingly, there exists a need in the art for improved release material, which may be embodied in both sheet and web, which overcomes the above-noted prior art problems.

SUMMARY OF THE INVENTION

It is the object of the present invention to provide improved release material, which may be embodied as sheet or web, which overcomes the above-noted prior art problems attendant to prior art release material, sheets and webs.

Improved release material satisfying such object and embodying the present invention may include a paper substrate, and a layer of plastic film on one surface of the substrate wherein the plastic film layer is provided with an outer surface which substantially eliminates area contact between the layer of plastic film and material in engagement therewith; in the preferred embodiment, the outer surface of the layer of plastic film is an embossed surface providing substantially line contact with the material in engagement therewith.

DESCRIPTION OF THE DRAWINGS

FIG. 1 is a cross-sectional view of composite structure including the improved release material embodying the present invention, and structure, shown in dashed outline or in phantom, to which such improved release material may be adhered;

FIG. 2 is a cross-sectional view of a plurality of sheets of improved release material embodying the present invention adhered to other structure such as the structure shown in dashed outline or in phantom in FIG. 1, but which other structure for clarity of presentation is shown in solid outline in FIG. 2; and FIG. 3 is an enlarged portion of FIG. 1.

DESCRIPTION OF THE PREFERRED EMBODIMENTS

Referring now to FIG. 1, there is shown a composite structure indicated by general numerical designation 10 including a substrate or layer of material 12 which may be an article of manufacture comprised of Mylar or the like, or a layer of decorative film such as prism film or glitter or the like, a layer of pressure sensitive adhesive 14, and a layer of improved release material embodying the present invention and indicated by general numerical designation 16. The improved release material 16 in the embodiment shown in FIG. 1 is shown in a sheet embodiment but it will be understood that such improved release material 16 may also be embodied in web form.

The improved release material 16 may include a paper substrate 18, which may be a layer of suitable heavy paper such as kraft paper, and layers of a suitable thermoplastic film 20 and 22, such as polyethylene or polyester, extruded onto the opposite surfaces of the pCaper 18. For enhanced releasing action, the improved release material 16 may be further provided with a suitable release coating 24 such as a suitable silicone or silicon polymer applied to the outer surface of the plastic film 20 to enhance release of the release material 16 from the layer or coating of pressure sensitive adhesive 14 adhered to the bottom surface of the substrate 12.

In accordance with the teachings of the present invention, the outer or bottom surface 26 of the layer of plastic film 22 may be suitably embossed as indicated by the irregular or see-saw line shown. As may be better understood by reference to FIG. 3, the embossed surface 26 may be defined by a plurality of outwardly extending, spaced apart ridges, e.g. ridges 31, 32 and 33, of generally triangular cross-sectional shape with the sides thereof, as shown in cross-section in FIG. 3, narrowing outwardly substantially to a point; it will be understood that the points in FIG. 3 in cross-section indicate that the ridges, e.g. ridges 31, 32 and 33, terminate outwardly in substantially a line.

The advance provides by the improved release material 16 of the present invention, and the advantages thereof over the abovenoted prior art, may be better understood by reference to FIG. 2 wherein there is shown a plurality of vertically stacked composite structures 10a ... 10d which, it will be understood, are the same as the composite indicated by general numerical designation 10 in FIG. 1. It will be noted that the embossed bottom surface 26a of improved release material 16a, is not in area contact with the top surface of the substrate 12b as would be in the case of prior art release material, but instead is in line contact as shown in FIG. 2 thereby providing air space between the engaged surfaces 26a and 16a; similarly, it would be understood that the embossed bottom surfaces 26b ... 26d are also in line contact, not area contact, with the engaged top surfaces of the substrates 12b ... 12d. Accordingly, it will be understood that upon vertical stacking of the composites 10a ... 10d as illustrated in FIG. 2, and upon the top surfaces of the substrates 12a ... 12d having suitable indicia applied thereto by not yet fully dried or cured ink, transfer or offsetting of the undried ink to the embossed surfaces 26a ... 26d of the layers of plastic film 22a ... 22d will be substantially eliminated by the noted line contact therebetween. Still further, and referring again to FIG. 2, it will be understood that sheet feeding of the composites 10a ... 10d by suitable automatic or mechanical sheet feeding equipment known to the art, will be greatly enhanced due to such line contact, particularly as compared to the area contact as is present with prior art release material, and still further upon separation of the respective layers of composite material 10a ... 10d, greatly reduced, if any, static friction will be generated due to the ease of separation facilitated by such line contact and intervening air space. It will be understood that upon the improved release material 16 of the present invention being embodied in web form and applied to other structures such as substrate 10 and pressure sensitive adhesive 14 also embodied in web form, and the composite structure rolled, the same advantages will be attendant thereto as noted with regard to the sheet and stacked composite structures of FIG. 2.

Referring again to FIG. 1, further advantages of the improved release material 16 of the present invention will now be described. It will be assumed, for example, that the substrate 12 and layer of pressure sensitive adhesive 14 shown in phantom or dashed outline in FIG. 1 is not present, but instead that a plurality of sheets of improved release film 16, including the layer of release coating 24, have been stacked vertically as typically would be the case during storage or even shipment of such stacked sheets, prior to application to other structures. In such instance, it will be understood that the bottom embossed surface of the layer of plastic film 22 will engage the underlying top surface of a release coating 24 in line, not area, contact, and hence transfer or offsetting of any not fully dried or cured release coating 24 to the embossed surface thereabove, and in engagement therewith, will be substantially eliminated. Similarly, it will be understood that upon the improved release material 16 of FIG. 1 not yet having the substrate 12 and layer of pressure sensitive adhesive 14 applied thereto, but having the release coating 24 present, may be rolled, in either direction, into a relatively tight or compact roll and that in such event the embossed surface 26 of the plastic film 22 will engage the top surface of the release coating 24 in line, not area, contact, thereby again substantially eliminating transfer or offsetting of any undried or uncured release coating 24 to the opposed and engaged embossed surface 26.

A still further advantage of the embossed surface 26 of the layer of polyethylene 22 is that such embossing enhances the printability of the plastic surface beyond that of a smooth and unembossed plastic surface.

It will be understood by those skilled in the art that the improved release material 16 of the present invention may be manufactured by processes known to the art such as, by way of example, the manufacturing process set forth in the above-identified patent to Hurst. The embossing of the outer surface 22 of the polyethylene or the like film may also be performed by embossing processes known to the art for embossing a plastic surface such as, for example, the use of a knurled roller over which the plastic film 22 is passed. Still further, it will be understood that the embossing may be in the form of straight lines, in a spiral or swirl, or in other geometric configurations.

In summary, the advantages of the improved release material 16 of the present invention include: (1) enhanced sheet feeding, (2) reduction of generation of static charge upon separation as in machine sheet feeding, (3) enhanced printability of the embossed surface, (4) printing on the embossed surface is less susceptible to smearing and/or offsetting, (5) substantial elimination of offsetting or transfer of silicone release coating or undried ink upon vertical stacking or rolling.

It will be understood by those skilled in the art that many modifications and variations of the present invention are possible without departing from the spirit and the scope thereof.

What is claimed is:

1. Improved release material for backing and releasing from a surface, comprising:

a paper substrate, a first layer of plastic film on one surface of the substrate, a second layer of plastic film on the other surface of the substrate, a release coating on the outer surface of the first layer of plastic film, and the outer surface of said second layer of plastic film being embossed to provide a plurality of outwardly extending members for engaging an adjacent surface, upon engagement with said adjacent surface, said plurality of outwardly extending members eliminating area contact between said second layer of plastic film and said adjacent surface.

2. Release material according to claim 1 wherein said outwardly extending members are a plurality of outwardly extending, spaced apart ridges of generally triangular cross-sectional shape with the sides thereof in cross-section narrowing outwardly to substantially a point.

3. Improved release material according to claim 1, wherein said layers of plastic film are polyethylene.

4. Improved release material according to claim 1 wherein said layers of plastic film are polyester.

5. Improved release material for backing and releasing from a surface, comprising:

a paper substrate, a first layer of plastic film on one surface of the substrate, a second layer of plastic film on the other surface of the substrate, a release coating on the outer surface of the first layer of plastic film, and the outer surface of said second layer of plastic film provided with a plurality of outwardly extending spaced apart ridges of generally triangular cross-sectional shape with the sides thereof in cross-section narrowing outwardly to substantially a point, said points for engaging an adjacent surface, upon engagement with said adjacent surface, said plurality of points substantially eliminating area contact between said second layer of plastic film and said adjacent surface.

* * * * *